C. BLUME.
HARNESS HOOK.
APPLICATION FILED AUG. 28, 1913.
1,113,535.
Patented Oct. 13, 1914.
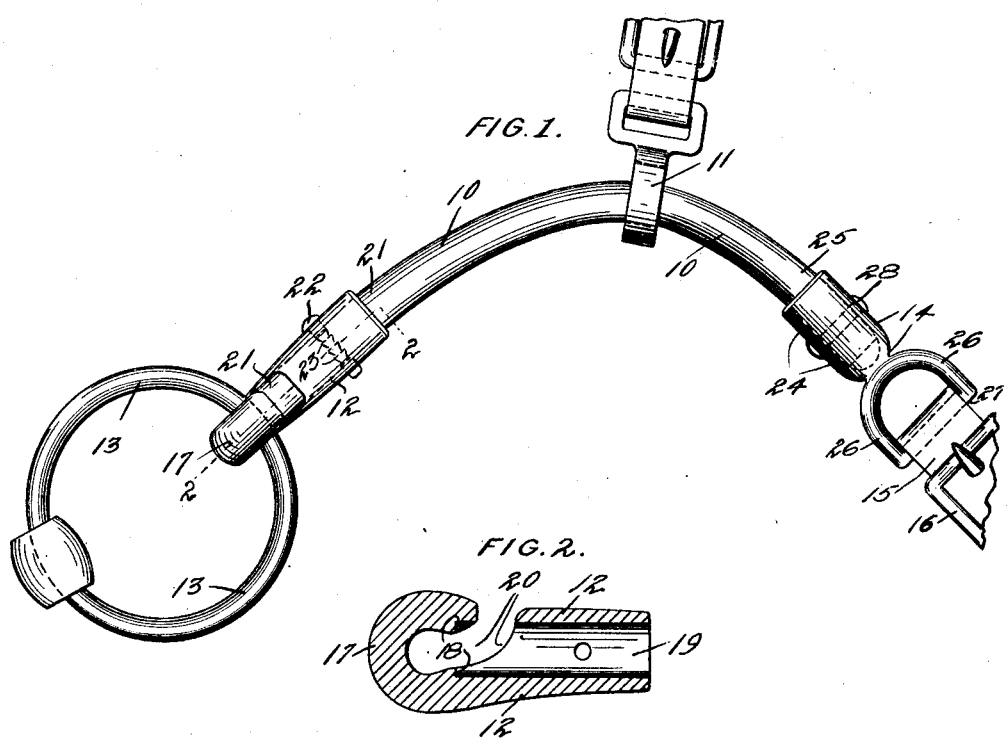
WITNESSES
Paul A. Viersen
Iva G. Wooden
INVENTOR
Charles Blume
Carl Frover
BY                    ATTY.

UNITED STATES PATENT OFFICE.

CHARLES BLUME, OF CHICAGO, ILLINOIS.

HARNESS-HOOK.

1,113,535.  Specification of Letters Patent.  Patented Oct. 13, 1914.

Application filed August 28, 1913. Serial No. 787,091.

*To all whom it may concern:*

Be it known that I, CHARLES BLUME, a citizen of the United States, residing in the city of Chicago, county of Cook, and State of Illinois, have invented certain new and useful Improvements in Harness-Hooks, of which the following is a specification.

The object of my invention is to provide more sightly, durable and inexpensive connecting means for harness, adapted particularly for connecting sidechecks and reins to the bitrings.

In the drawings Figure 1 is a side elevation of a sidecheck provided with my device; Fig. 2 is a crosssection of my device along the line 2—2 in Fig. 1; and Fig. 3 is a side elevation of the pin preferably used in attaching my device to the sidecheck, etc.

Referring to the drawings, sidecheck 10, running through gagrunner 11, at its front carries a hook member 12, engaging bitring 13, and at its rear end is connected to a centercheck in any suitable manner. Hook member 12 consists of hook 17, preferably with interior shoulders 18, and hollow shank 19, the interior of which opens into hook opening 20 in such a manner as to permit end 21 of sidecheck 10 to extend beyond opening 20, through shank 19, until it meets shoulders 18. End 21 is secured against withdrawal preferably by a pin 22 provided with annular corrugations 23 which hold the pin in place even though its end is not riveted, but do not prevent withdrawal in case of need. It will readily be seen that the advancing of end 21 beyond opening 20 not only prevents disengagement of hook 17 from ring 13, but also improves the appearance of the assembled device. Shoulders 18 are of advantage in providing a definite stop for end 21, thereby making it impossible for end 21 to be advanced so far as to engage on ring 13.

I claim:—

In a harness hook, the combination of a hollow shank having a longitudinal opening, adapted to receive and surround the end of a strap, with a hook having interior recesses and shoulders on both the point and the base, said recesses being formed in line with the opening in the shank and adapted to receive and surround the end of the strap, and said shoulders being adapted to limit the movement of said strap, substantially as and for the purpose described.

CHARLES BLUME.

Witnesses:
 CARL STROVER,
 HENRY M. MATTHEWS.

Copies of this patent may be obtained for five cents each, by addressing the "Commissioner of Patents, Washington, D. C."